(12) United States Patent
Wittenberg et al.

(10) Patent No.: US 12,363,408 B2
(45) Date of Patent: *Jul. 15, 2025

(54) METHODS AND APPARATUS FOR ALIGNING A LENS HOLDER IN A SMALL-HEIGHT SCAN ENGINE

(71) Applicant: ZEBRA TECHNOLOGIES CORPORATION, Lincolnshire, IL (US)

(72) Inventors: Carl D. Wittenberg, Water Mill, NY (US); Bryan E. Joles, Selden, NY (US); Robert T. Roedig, Farmingdale, NY (US); William P. Hurley, IV, New York, NY (US); David A. Chiesa, East Quogue, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,931

(22) Filed: Oct. 2, 2023

(65) Prior Publication Data
US 2024/0031662 A1    Jan. 25, 2024

Related U.S. Application Data

(63) Continuation of application No. 17/498,274, filed on Oct. 11, 2021, now Pat. No. 11,778,294.

(51) Int. Cl.
*G02B 7/02* (2021.01)
*G06T 7/00* (2017.01)
(Continued)

(52) U.S. Cl.
CPC ............ *H04N 23/55* (2023.01); *G02B 7/023* (2013.01); *G06T 7/0006* (2013.01); *G06T 7/70* (2017.01); *H04N 23/54* (2023.01); *F03G 7/0665* (2021.08); *G03B 3/02* (2013.01); *G06T 2207/30164* (2013.01)

(58) Field of Classification Search
USPC ........................................................... 348/95
See application file for complete search history.

(56) References Cited

U.S. PATENT DOCUMENTS 4,560,862 A * 12/1985 Eastman ............ G06K 7/10811
                                                    359/220.1
7,729,069 B2 * 6/2010 Chang .................... G02B 7/023
                                                       359/819

(Continued)

*Primary Examiner* — Clayton E. LaBalle
*Assistant Examiner* — Warren K Fenwick
(74) *Attorney, Agent, or Firm* — Yuri Astvatsaturov

(57) ABSTRACT

Methods and apparatus for aligning a lens holder in a small-height scan engine are disclosed herein. An example method for aligning a lens holder in a small-height scan engine includes: mounting an image sensor to a circuit board; optically aligning, using one or more alignment fixtures, a lens holder holding one or more lenses or optical elements with the image sensor based upon one or more images captured by the image sensor through the lens holder; and after the lens holder and image sensor are optically aligned, physically aligning, using the one or more alignment fixtures, the lens holder with the circuit board based upon a misalignment between a surface of the lens holder and an edge of the circuit board.

22 Claims, 8 Drawing Sheets

(51) Int. Cl.
*G06T 7/70* (2017.01)
*H04N 23/54* (2023.01)
*H04N 23/55* (2023.01)
*F03G 7/06* (2006.01)
*G03B 3/02* (2021.01)

(56) References Cited

U.S. PATENT DOCUMENTS

| | | | |
|---|---|---|---|
| 8,300,332 B2* | 10/2012 | Campbell | H01L 27/14618 |
| | | | 359/811 |
| 10,187,636 B2* | 1/2019 | Wong | H04N 23/57 |
| 10,373,992 B1* | 8/2019 | Hsu | G02B 7/022 |
| 10,599,896 B1* | 3/2020 | Vinogradov | G02B 27/0972 |
| 10,969,659 B2* | 4/2021 | Park | H04N 23/51 |
| 11,012,598 B2* | 5/2021 | Yeung | H04N 17/002 |
| 11,070,709 B2* | 7/2021 | Lee | G02B 27/62 |
| 11,159,706 B2* | 10/2021 | Yamamoto | H04N 23/55 |
| 11,513,424 B2* | 11/2022 | Park | H04N 23/90 |
| 11,778,294 B2* | 10/2023 | Wittenberg | G06T 7/70 |
| | | | 348/95 |
| 2022/0221683 A1* | 7/2022 | Drzymala | G02B 7/021 |
| 2022/0381955 A1* | 12/2022 | Wittenberg | G02B 1/041 |

* cited by examiner

METHODS AND APPARATUS FOR ALIGNING A LENS HOLDER IN A SMALL-HEIGHT SCAN ENGINE

BACKGROUND

Conventionally, a scan engine is assembled by, among other things, mounting an image sensor to a circuit board, optically aligning a lens holder holding one or more lenses with the image sensor, and securing the lens holder to the circuit board. The scan engine is typically mounted in a housing via holes in the circuit board. Therefore, in many instances, an actual dimension of the circuit board in at least one direction determines an overall actual dimension of the scan engine in that direction. Accordingly, a dimension of an area in the housing in which the scan engine is to be mounted can be determined based upon a corresponding maximum dimension of the circuit board. However, in a small-height or miniature scan engine (e.g., having a height less than 1 cm, a height of 7.2 mm, etc.), the circuit board and the lens holder may have the same nominal dimension in at least one direction. Thus, tolerances in the dimensions of the circuit board, tolerances in the dimensions of the lens holder, mounting tolerances for the image sensor, optical alignment tolerances, etc. may result in the small-height scan engine having an overall dimension in at least one direction that exceeds a maximum allowed size.

According, there is a need for methods and apparatus for aligning a lens holder in a small-height scan engine.

SUMMARY

In an embodiment, a method for aligning a lens holder in a small-height scan engine includes: mounting an image sensor to a circuit board; optically aligning, using one or more alignment fixtures, a lens holder holding one or more lenses or optical elements with the image sensor based upon one or more images captured by the image sensor through the lens holder; and after the lens holder and image sensor are optically aligned, physically aligning, using the one or more alignment fixtures, the lens holder with the circuit board based upon a misalignment between a surface of the lens holder and an edge of the circuit board.

In a variation of this embodiment, physically aligning the lens holder with the circuit board includes physically aligning the surface of the lens holder with the edge of the circuit board.

In a variation, the surface of the lens holder is aligned with the edge of the circuit board when the surface of the lens holder and the edge of the circuit board are coplanar.

In a variation, the surface of the lens holder, when physically aligned with the edge of the circuit board, together with the edge of the circuit board form a first mounting surface, and the method further includes securing the scan engine in a housing such that the first mounting surface is secured against a second mounting surface of the housing and the circuit board is perpendicular to the second mounting surface.

In a variation of this embodiment, the lens holder is physically aligned with the circuit board to satisfy a dimension requirement for the scan engine.

In a variation, the dimension requirement is less than a maximum possible dimension of the circuit board and the lens holder in combination that includes nominal dimensions, dimension tolerances and alignment tolerances.

In a variation, the dimension requirement is 7.2 mm.

In a variation of this embodiment, physically aligning the lens holder with the circuit board includes moving the lens holder and/or the circuit board along only one axis.

In a variation of this embodiment, physically aligning the lens holder with the circuit board includes: capturing, with a machine vision camera, one or more first images of the edge of the circuit board together with the surface of the lens holder; moving, using the alignment fixture, the lens holder and/or the circuit board based upon the one or more first images; capturing, with the machine vision camera, one or more second images of the edge of the circuit board together with the surface of the lens holder; and verifying a physical alignment of the surface of the lens holder with the edge of the circuit board based upon the one or more second images.

In a variation of this embodiment, after physically aligning the lens holder with the circuit board, the lens holder is optically misaligned with the image sensor.

In a variation, the lens holder is optically misaligned with the image sensor only along one axis.

In a variation of this embodiment, the method further includes determining an offset between the edge of the circuit board and the surface of the lens holder, wherein the lens holder is physically aligned with the circuit board in response to the offset satisfying a criteria.

In a variation of this embodiment, physically aligning the lens holder with the circuit board includes: determining an amount of movement of the lens holder relative to the circuit board necessary to align the surface of the lens holder with the edge of the circuit board; and rejecting the scan engine when the amount of movement satisfies a criteria.

In a variation of this embodiment, the method further includes: after physically aligning the lens holder with the circuit board, determining a dimension of the scan engine that includes the circuit board and the lens holder; and rejecting the scan engine when the dimension satisfies a criteria.

In a variation of this embodiment, optically aligning the lens holder with the image sensor includes aligning an optical axis of the lens holder with a center pixel of the image sensor.

In a variation of this embodiment, physically aligning the lens holder with the circuit board includes moving the lens holder relative to the circuit board and/or moving the circuit board relative to the lens holder.

In a variation of this embodiment, the method further includes, after the circuit board is physically aligned with the lens holder, securing the lens holder to the circuit board.

In another embodiment, an assembly apparatus for aligning a lens holder in a scan engine includes: a first fixture configured to hold a circuit board having an image sensor mounted thereon; a second fixture configured to hold a lens holder holding one or more lenses or optical elements; and a machine vision camera. The assembly further includes a controller configured to control at least one of the first fixture or the second fixture to optically align the lens holder with the image sensor based upon one or more images captured by the image sensor through the lens holder, control the camera to capture one or more images of a surface of the lens holder together with an edge of the circuit board, and after the optical alignment, control the at least one of the first fixture or the second fixture to move based upon the edge of the circuit board.

In a variation of this embodiment, the controller is configured to control the at least one of the first fixture or the second fixture to move based upon the edge such that the surface of the lens holder and the edge of the circuit board are physically aligned.

In a variation of this embodiment, the controller is configured to control the at least one of the first fixture or the second fixture to move based upon the edge such that a dimension requirement for the scan engine is satisfied.

In a variation of this embodiment, the controller is configured to control the at least one of the first fixture or the second fixture to move based upon the edge such the lens holder and the circuit board only move relative to each other only along one axis.

In a variation of this embodiment, the controller is configured to, after controlling at least one of the first fixture or the second fixture to move based upon the edge, cause the lens holder to be secured to the circuit board.

In yet another embodiment, a non-transitory, computer-readable, storage medium stores computer-readable instructions that, when executed by one or more processors, cause an assembly apparatus to: control a first fixture of the assembly apparatus to secure a circuit board having an image sensor mounted thereon; control a second fixture of the assembly apparatus to secure a lens holder holding one or more lenses or optical elements; control at least one of the first fixture or the second fixture to optically align the lens holder with the image sensor based upon one or more images captured by the image sensor through the lens holder; control a camera of the assembly apparatus to capture one or more images of a surface of the lens holder together with an edge of the circuit board; and after the optically alignment, control at least one of the first fixture or the second fixture to move based upon a misalignment between the surface of the lens holder and the edge of the circuit board.

In a variation of this embodiment, the instructions, when executed by the one or more processors, causes the assembly apparatus to control at least one of the first fixture or the second fixture to move based upon the misalignment such that the surface of the lens holder and the edge of the circuit board are physically aligned.

In a variation of this embodiment, the instructions, when executed by the one or more processors, causes the assembly apparatus to control at least one of the first fixture or the second fixture to move based upon the misalignment such the lens holder and the circuit board only move relative to each other along one axis.

In still another embodiment, an scan engine includes: a circuit board; an image sensor mounted to the circuit board; and a lens holder holding one or more lenses or optical elements mounted to the circuit board above the image sensor, wherein the image sensor is configured to capture images of a field of view through the lens holder, and wherein a surface of the lens holder is coplanar with an edge of the circuit board such that the lens holder is not optically aligned with the image sensor along at least one axis.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
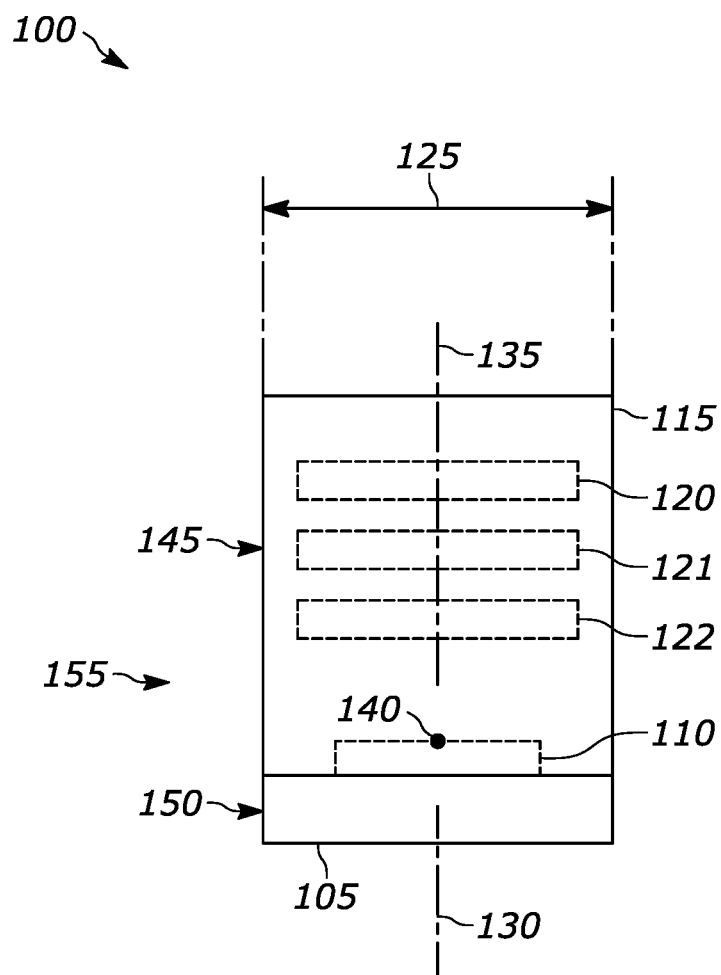
FIG. 1 is a block diagram of an example scan engine, in accordance with embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Reference will now be made in detail to non-limiting examples, some of which are illustrated in the accompanying drawings.

While example scan engines are shown in particular orientations in the attached figures and described with terms (e.g., width, height, etc.) according to those orientations, it will be readily apparent to those of ordinary skill in the art that such terms may need to be changed when a scan engine is considered in a different orientation. Further, while the following description and the attached claims refer to optical alignment, physical alignment, coplanar, etc., it will be readily apparent to those of ordinary skill in the art that such alignments need not be precise and are typically done to within a pre-determined tolerance. Thus, the term alignment (e.g., optical or physical) refers to both substantial alignment, and alignment within a pre-determined tolerance; and the term coplanar refers to both substantially coplanar, and coplanar within a pre-determined tolerance.

FIG. 1 illustrates an end view of an example scan engine 100 including, among other things, a circuit board 105 having an image sensor 110 mounted thereon, and a lens holder 115 holding one or more lenses or other optical elements 120, 121, 122. In the example of FIG. 1, the circuit board 105 and the lens holder 115 have the same width 125 (i.e., in the horizontal direction in FIG. 1), the image sensor 110 is mounted at the center 130 of the circuit board 105, and an optical axis 135 of the lens holder 115 is optically aligned with a center pixel 140 of the image sensor 110. Thus, an overall width of the scan engine 100 is the same as the width 125 of the circuit board 105 and the lens holder 115, and a surface 145 of the lens holder 115 is physically aligned (e.g., coplanar) with an edge 150 of the circuit board. In some examples, the surface 145 and the edge 150 form a mounting surface 155, and the scan engine 100 is mount on its side with the mounting surface 155 against a mounting surface of a housing such that the circuit board 105 is perpendicular to the mounting surface of the housing.

In the illustrated example of FIG. 1, all the parts have their nominal widths and are substantially aligned. However, in practice, the widths of the circuit board 105 and the lens holder 115 may vary due to manufacturing tolerances, the image sensor 110 may be off center due to manufacturing tolerances, and/or the lens holder 115 and the image sensor 110 may not be precisely optically aligned due to alignment tolerances.

Figures 2, 3:
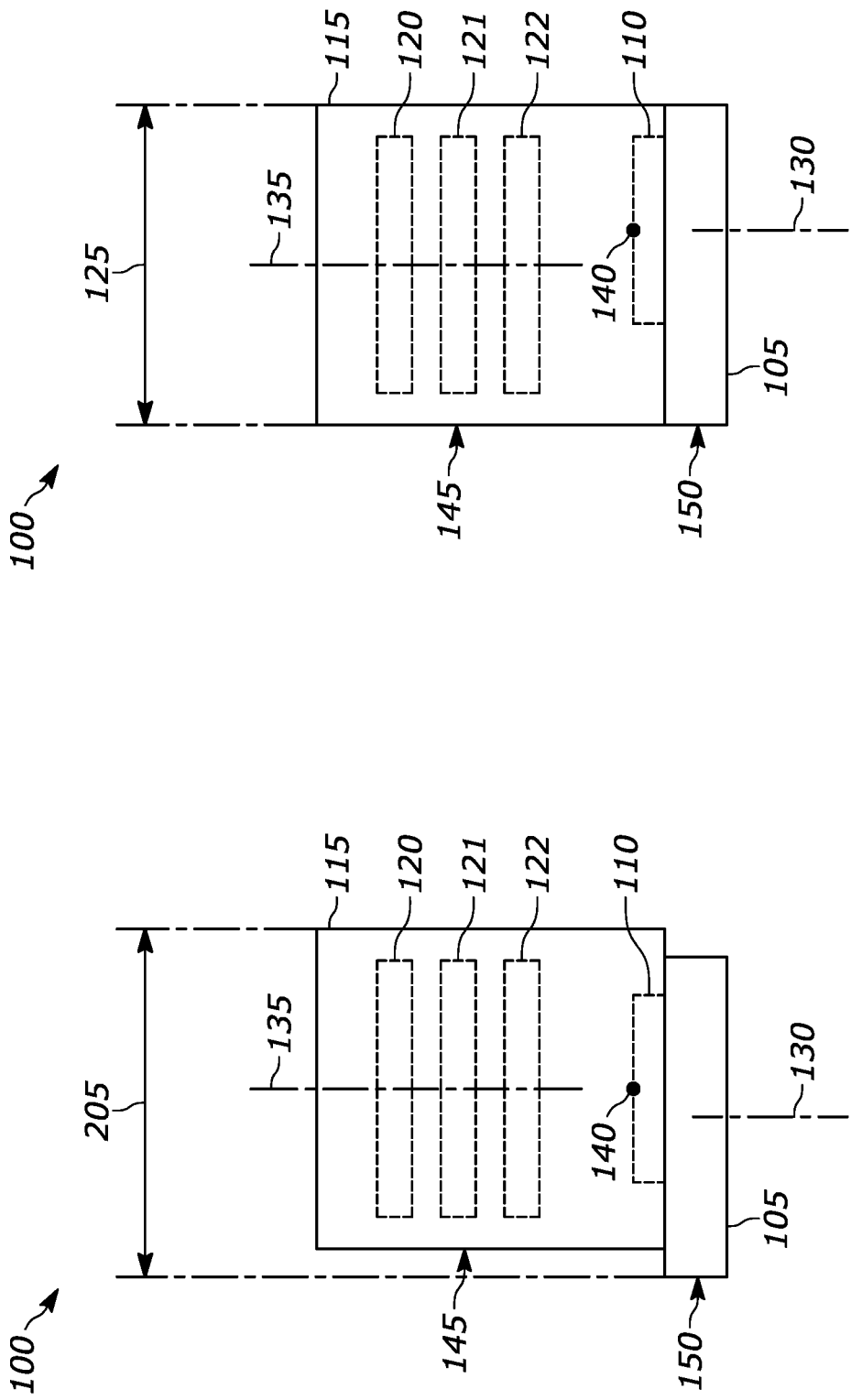
FIG. 2 is a block diagram of an example scan engine after optical alignment, in accordance with embodiments of the disclosure.
FIG. 3 is a block diagram of the example scan engine of FIG. 2 after adjustment based upon an edge of a circuit board, in accordance with embodiments of the disclosure.

FIG. 2 illustrates an end view of the example scan engine 100 of FIG. 1 when, for example, the image sensor 110 is off center due to manufacturing tolerances. Thus, the lens holder 115 and circuit board 105 are physically misaligned (e.g., offset). That is, the surface 145 and the edge 150 are not physically aligned (e.g., not coplanar). Accordingly, an overall width 205 of the scan engine 100 is greater than a width of the circuit board 105. Depending on manufacturing tolerances and/or alignment tolerances, the resulting width 205 of the scan engine 100 may exceed a maximum allowable width of the scan engine 100.

The offset of the lens holder 115 relative to the circuit board 105 shown in FIG. 2 may also arise when, for example, the image sensor 110 is centered on the center 130 of the circuit board, but the lens holder 115 is not precisely optically aligned with the image sensor 110. Furthermore, the offset may arise due to image sensor 110 misplacement and optical misalignment. Further still, the offset may arise due to the lens holder 115 being wider than its nominal width. Still further, the lens holder 115 may protrude to the right past the circuit board 105 (e.g., as shown in FIG. 2) or to the left.

In some embodiments, (1) a maximum allowable width of the scan engine 100 (e.g., 7.2 mm) is the same as the maximum width of the circuit board 105 (e.g., width of circuit board 105 is 7.1±0.1 mm); (2) a width of the lens holder 115 is 7.1±0.05 mm, and (3) optical alignment is ±0.2 mm due to image sensor 110 placement and/or optical alignment tolerances. Thus, given a circuit board 105 having its maximum width of 7.2 mm, any offset of the lens holder 115 relative to the circuit board (e.g., ±0.2 mm) may result in an overall dimension 205 of the scan engine 100 (e.g., 7.4 mm) that exceeds the maximum allowable width (e.g., 7.2 mm). Additionally and/or alternatively, in some embodiments, the scan engine 100 is mounted on its side with the surface 145 and the edge 150 against a mounting surface of a housing such that the circuit board 105 is perpendicular to the mounting surface of the housing. In such embodiments, any protrusion of the edge 150 beyond the surface 145 (e.g., as shown in FIG. 2) may result in mounting forces applied against the circuit board 105 such that the lens holder 115 may become unsecured from the circuit board 105.

Accordingly, in disclosed embodiments, after the lens holder 115 is optically aligned (e.g., within a pre-determined tolerance) with the image sensor 110 (e.g., as shown in FIG. 2) but before the lens holder 115 is secured to the circuit board 105, the lens holder 115 is physically aligned with the circuit board 105 based upon the edge 150 (e.g., based upon a misalignment of the surface 145 and the edge 150). For example, such that the surface 145 and the edge 150 are physically aligned (e.g., such that they are coplanar), as shown in FIG. 3. In some examples, physically aligning the lens holder 115 with the circuit board 105 only adjusts their positions with respect to the other along only one axis (e.g., only adjusting the surface 145 towards or away from the edge 150). As used herein, aligning part A with part B refers to any of (1) moving part A while part B is held still, (2) moving part B while part A is held still, or (3) moving both part A and part B. Moreover, which parts are moved and held still may vary during an assembly process.

In some examples, a machine vision camera is used during an assembly process for the scan engine 100 to capture one or more images of the end of the scan engine 100 that shows the surface 145 and the edge 150, and a controller controls an assembly apparatus (e.g., the example assembly apparatus 600 of FIG. 6) to adjust the position of the lens holder 115 relative to the circuit board 105 and/or the position of the circuit board 105 relative to the lens holder 115 based upon the one or more images. In some examples, the controller determines an offset between the surface 145 and the edge 150 based upon images captured after optical alignment (e.g., as shown in FIG. 2). To ensure a minimum optical alignment, the controller may reject (e.g., discard) a scan engine when the offset exceeds a threshold. In some examples, the controller only adjusts the position of the lens holder 115 relative to the circuit board 105 and/or the position of the circuit board 105 relative to the lens holder 115 when the lens holder 115 protrudes beyond either edge of the circuit board 105 (e.g., to the right as shown in FIG. 2, or to the left). The controller may, as images are captured, control the assembly apparatus to make incremental movements of the circuit board 105 and/or the lens holder 115 until the surface 145 and the edge 150 are physically aligned (e.g., within a threshold distance). Additionally and/or alternatively, the controller may determine, based upon the captured image(s), a needed adjustment, control the assembly apparatus to move a corresponding amount, and then use one or more captured images to verify the alignment. In some examples, after the physical alignment of the lens holder 115 with the circuit board 105, the controller uses one or more additional captured images to verify an actual overall width of the scan engine 100 such that a scan engine 100 that exceeds a maximum allowable width may be rejected (e.g., discarded).

The lens holder 115 may become optically misaligned with the image sensor 110 due to the physical alignment of the lens holder 115 with the circuit board 105 based upon a misalignment of the surface 145 and the edge 150. However, when an offset is due, at least in part, to an error in the initial optical alignment, the lens holder 115 may become better optically aligned with the image sensor 110 due to the physical alignment of the lens holder 115 with the circuit board 105.

When for example, (1) a maximum allowable width of the scan engine 100 (e.g., 7.2 mm) is the same as the maximum width of the circuit board 105 (e.g., width of circuit board 105 is 7.1±0.1 mm) and (2) a maximum width of the lens holder 115 (e.g., width of lens holder 115 is 7.1±0.05 mm) is less than or equal to the maximum width of the circuit board 105, then physically aligning the lens holder 115 with the circuit board 105 (e.g., physically aligning the surface 145 with the edge 150 as shown in FIG. 3) ensures that the scan engine 100 is no wider than the maximum allowable scan engine width. In addition to ensuring that the width of the scan engine 100 is acceptable, physically aligning the surface 145 with the edge 150, additionally and/or alternatively, may reduce mounting forces on the circuit board 105 when the scan engine 100 is mounted on its side against a mounting surface of a housing.

Figure 4:
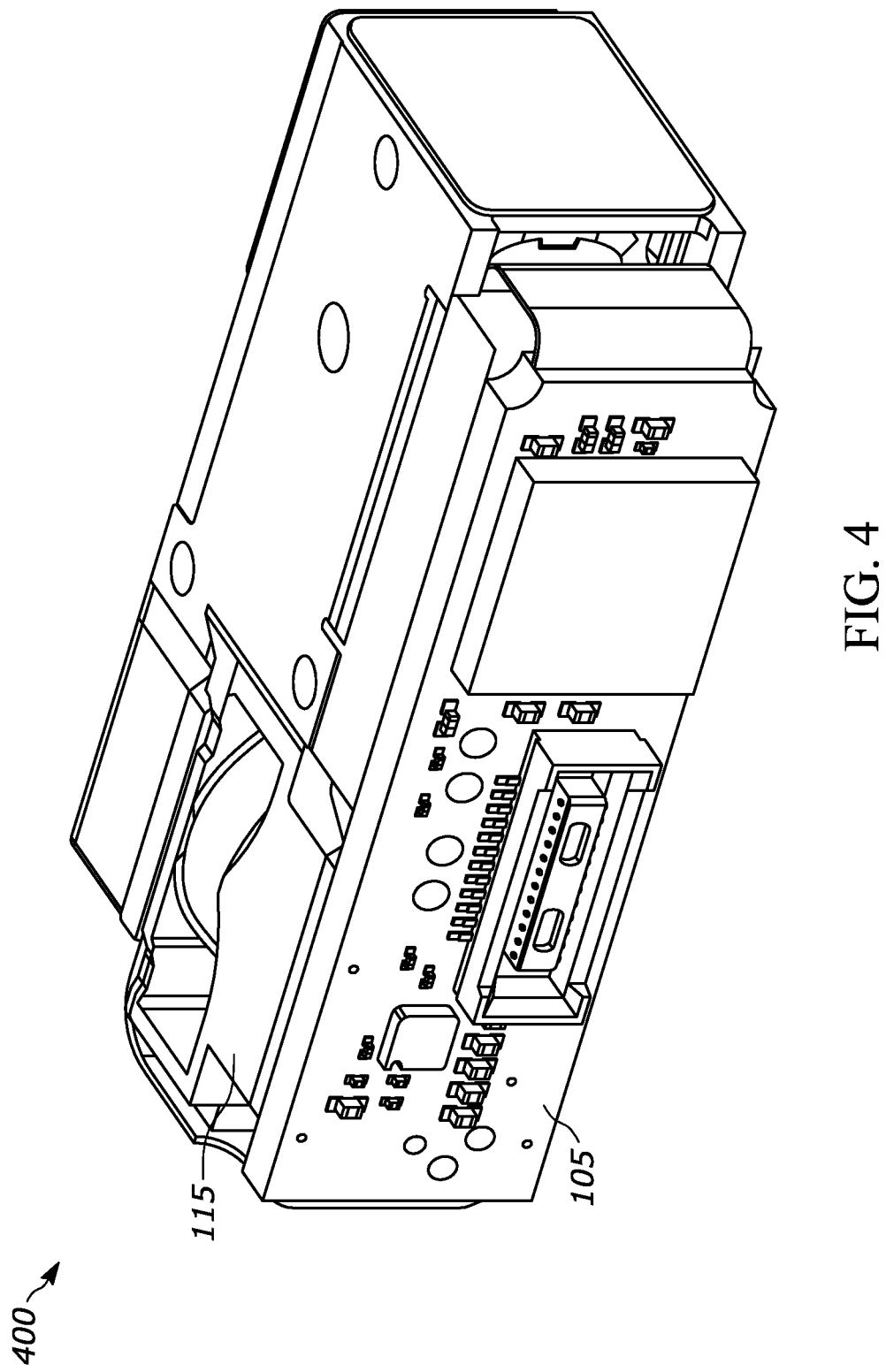
FIG. 4 is a perspective bottom view of an example small-height scan engine that may be aligned according to the methods disclosed herein.
Figure 5:
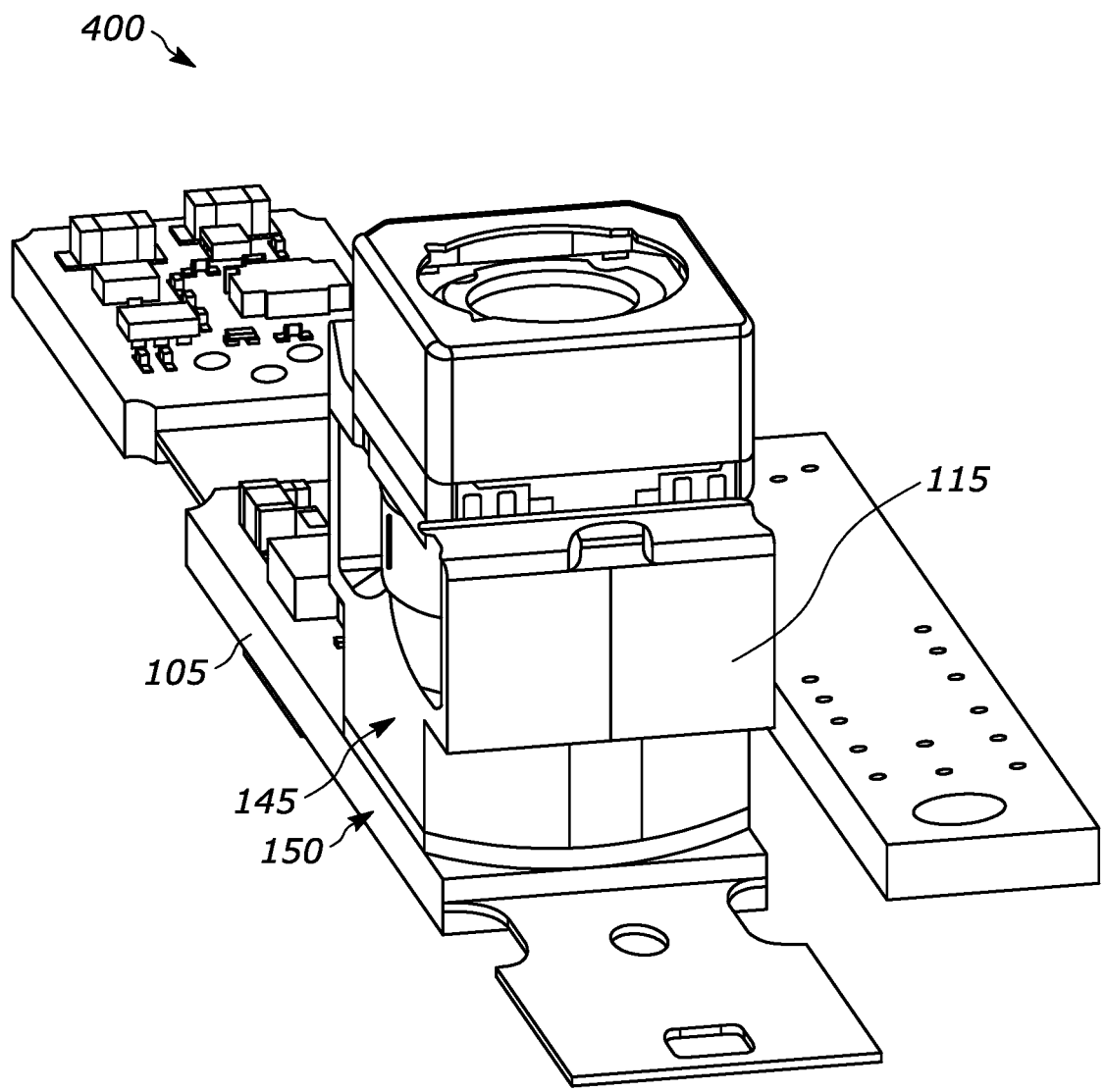
FIG. 5 is a perspective side view of the example small-height scan engine of FIG. 4 after lens holder physical alignment according to the methods disclosed herein.

FIG. 4 is a perspective bottom view of an example small-height scan engine 400 that may be used to implement the example scan engine 100 of FIGS. 1-3. FIG. 5 is a perspective side view of the example small-height scan engine 400 of FIG. 4 after lens holder physical alignment with the circuit board according to methods disclosed herein. The scan engine 400 includes the circuit board 105 and the lens holder 115. As shown in FIG. 5, after optical alignment of the lens holder 115 with an image sensor (not shown for clarity of illustration), the surface 145 of the lens holder 115 is physically aligned (e.g., coplanar) with the edge 150 of the circuit board 105.

The example small-height scan engine 400 of FIGS. 4 and 5 is disclosed in U.S. Provisional Patent Application No. 63/194,506 (filed May 28, 2021, and entitled "Imaging Lens System and Scan Engine Chassis"), U.S. patent application Ser. No. 17/333,308 (filed May 28, 2021, and entitled "Moving Front Lens Group Mechanically Located to Fixed Rear Lens Group"), and U.S. patent application Ser. No. 17/333,628 (filed May 28, 2021, and entitled "Compact Diffractive Optical Element Laser Aiming System"). U.S. Provisional Patent Application No. 63/194,506, U.S. patent application Ser. Nos. 17/333,308 and 17/333,628 are incorporated herein by reference in their entirety.

Figure 6:
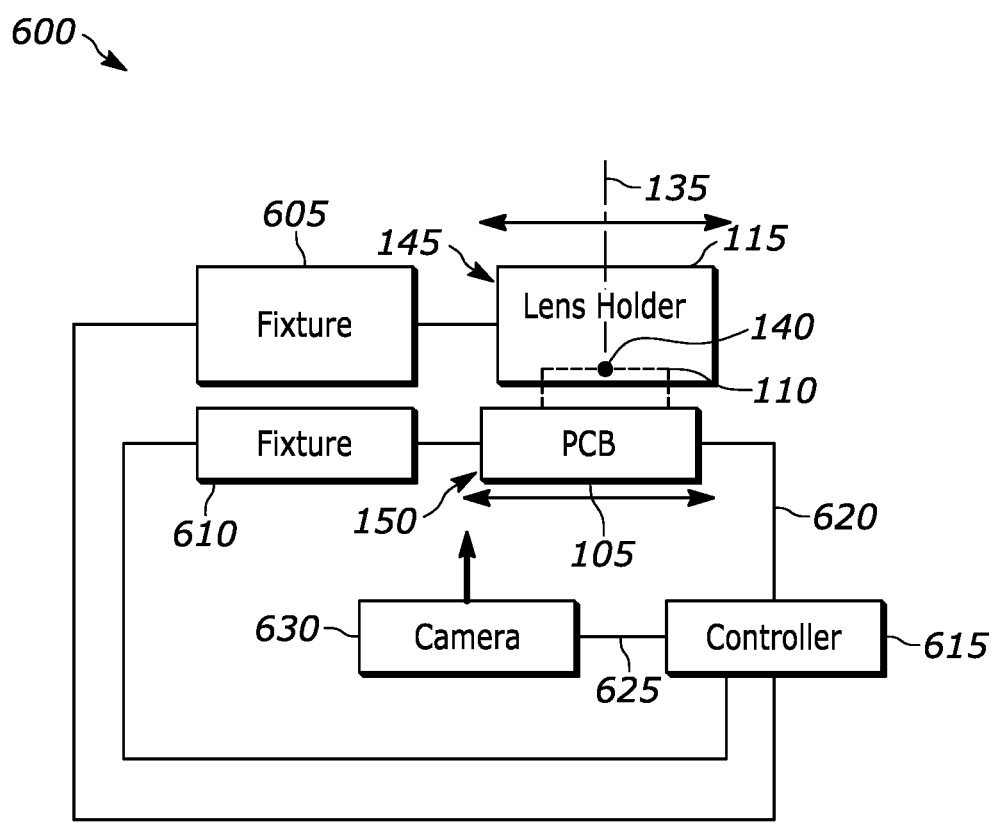
FIG. 6 is a schematic diagram of an example assembly apparatus, in accordance with embodiments of the disclosure.

FIG. 6 is a schematic diagram of an example assembly apparatus 600 configured to align lens holders in small-height scan engines, as disclosed herein. To secure, hold, move, etc. the lens holder 115, the assembly apparatus 600 includes a first alignment fixture 605. To secure, hold, move, etc. the circuit board 105 with the image sensor 110 mounted thereon, the assembly apparatus 600 includes a second alignment fixture 610. A controller 615 is configured to control the fixture 605 and/or the fixture 610 to position the lens holder 115 and/or the circuit board 105 relative to each other along one or more axes. To move the lens holder 115 and the circuit board 105 relative to each other, the controller 615 may (1) control the fixture 605 to move the lens holder 115 while controlling the fixture 610 to hold the circuit board 105 at a fixed location, (2) control the fixture 605 to hold the lens holder 115 at a fixed location while controlling the fixture 610 to move the circuit board 105, and/or (3) control the fixture 605 to move the lens holder 115 while controlling the fixture 610 to move the circuit board 105. Which parts are held fixed or move may vary during an assembly process for a scan engine.

The controller 615 controls, based upon one or more images 620 captured by the image sensor 110 through the lens holder 115, the fixture 605 and/or the fixture 610 to move the lens holder 115 and/or the circuit board 105 relative to each other to optically align the optical axis 135 of the lens holder 115 with the center pixel 140 of the image sensor 110, as shown in FIG. 2.

To capture images 625 of an end of a scan engine being assembled that includes the surface 145 and the edge 150, the assembly apparatus 600 includes a machine vision camera 630. The machine vision camera 630 may be a small, telecentric (e.g., parallax-free) machine vision camera that is positioned to image the end of a scan engine without interfering with movements of the first fixture 605 or the second fixture 610.

After the optical axis 135 of the lens holder 115 are optically aligned, the controller 615, based upon images 625 captured by the camera 630 of the surface 145 and the edge 150, controls movement of the fixture 605 and/or the fixture 610 to physically align the lens holder 115 with the circuit board 105 based upon the edge 150 (e.g., based upon a misalignment of the surface 145 and the edge 150). For example, the position of the lens holder 115 relative to the circuit board 105 and/or the position of the circuit board 105 relative to the lens holder 115 may be adjusted such that the surface 145 and the edge 150 are physically aligned (e.g., coplanar), as shown in FIG. 3. In some examples, the position of the lens holder 115 relative to the circuit board 105 and/or the position of the circuit board 105 relative to the lens holder 115 are only adjusted along one axis in one direction (e.g., only adjusting the surface 145 towards or away from the edge 150).

Figure 7:
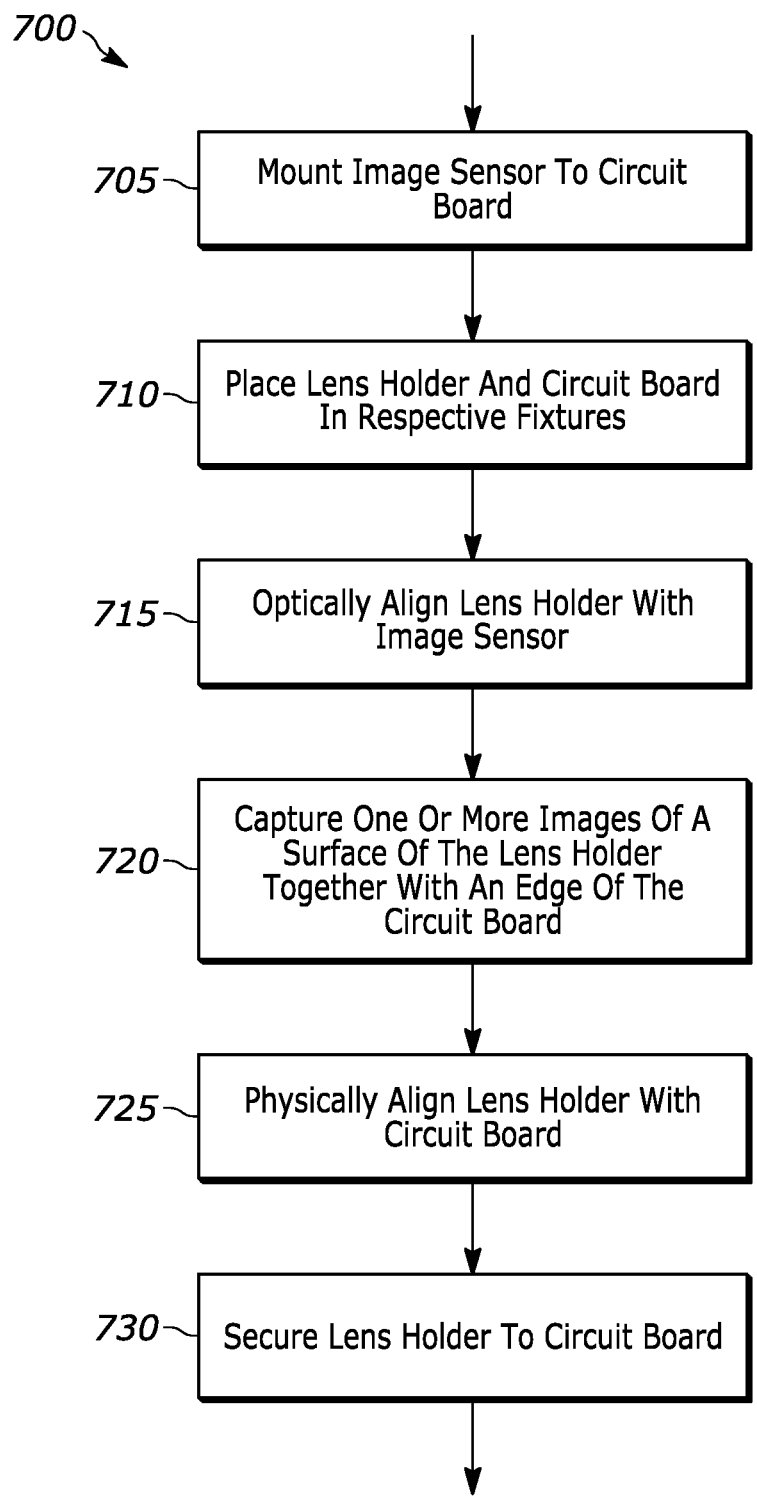
FIG. 7 is a flowchart representative of an example method, hardware logic, machine-readable instructions, or software for aligning a lens holder in a small-height scan engine, in accordance with embodiments of the disclosure.

FIG. 7 is a flowchart 700 representative of an example method, hardware logic, machine-readable instructions, or software for aligning a lens holder in a small-height scan engine, as disclosed herein. Any or all of the blocks of FIG. 7 may be an executable program or portion(s) of an executable program embodied in software and/or machine-readable instructions stored on a non-transitory, machine-readable storage medium for execution by one or more processors such as the processor 902 of FIG. 9. Additionally and/or alternatively, any or all of the blocks of FIG. 7 may be implemented by one or more hardware circuits structured to perform the corresponding operation(s) without executing software or instructions.

The flowchart of FIG. 7 begins at block 705 with an image sensor 110 being mounted to a circuit board 105 (block 705). A lens holder 115 is placed in a first alignment fixture (e.g., the alignment fixture 605 of FIG. 6), and the circuit board 105 is placed in a second alignment fixture (e.g., the alignment fixture 610) (block 710).

A controller (e.g., the controller 615 of FIG. 6) controls the first fixture and/or the second fixture to move the lens holder 115 and/or the circuit board 105 such that an optical axis 135 of the lens holder 115 is optically aligned with a center pixel of the image sensor 110 based upon images 620 captured by the image sensor 110 through the lens holder 115 (block 715).

A camera (e.g., the machine vision camera 630 of FIG. 3) captures one or more images (e.g., the images 625) of the scan engine being assembled that include the surface 145 of the lens holder 115 and the edge 150 of the circuit board 105 (block 720). After the optical alignment, the controller, based the captured images, controls the first fixture and/or the second fixture to physically align the lens holder 115 with the circuit board 105 based upon the edge 150 (e.g., based upon a physical misalignment of the surface 145 and the edge 150) (block 725). For example, the position of the lens holder 115 relative to the circuit board 105 and/or the position of the circuit board 105 relative to the lens holder 115 may be adjusted such that the surface 145 and the edge 150 are physically aligned (e.g., coplanar), as shown in FIG. 3. In some examples, the lens holder 115 and the circuit board 105 are only physically aligned along only one axis (e.g., only adjusting the surface 145 towards or away from the edge 150). An example flowchart 800 that may be carried out to implement block 725 is shown in FIG. 8 and described below.

After the lens holder 115 and circuit board 105 are physically aligned, the lens holder 115 is secured to the circuit board 105 (block 730).

Figure 8:
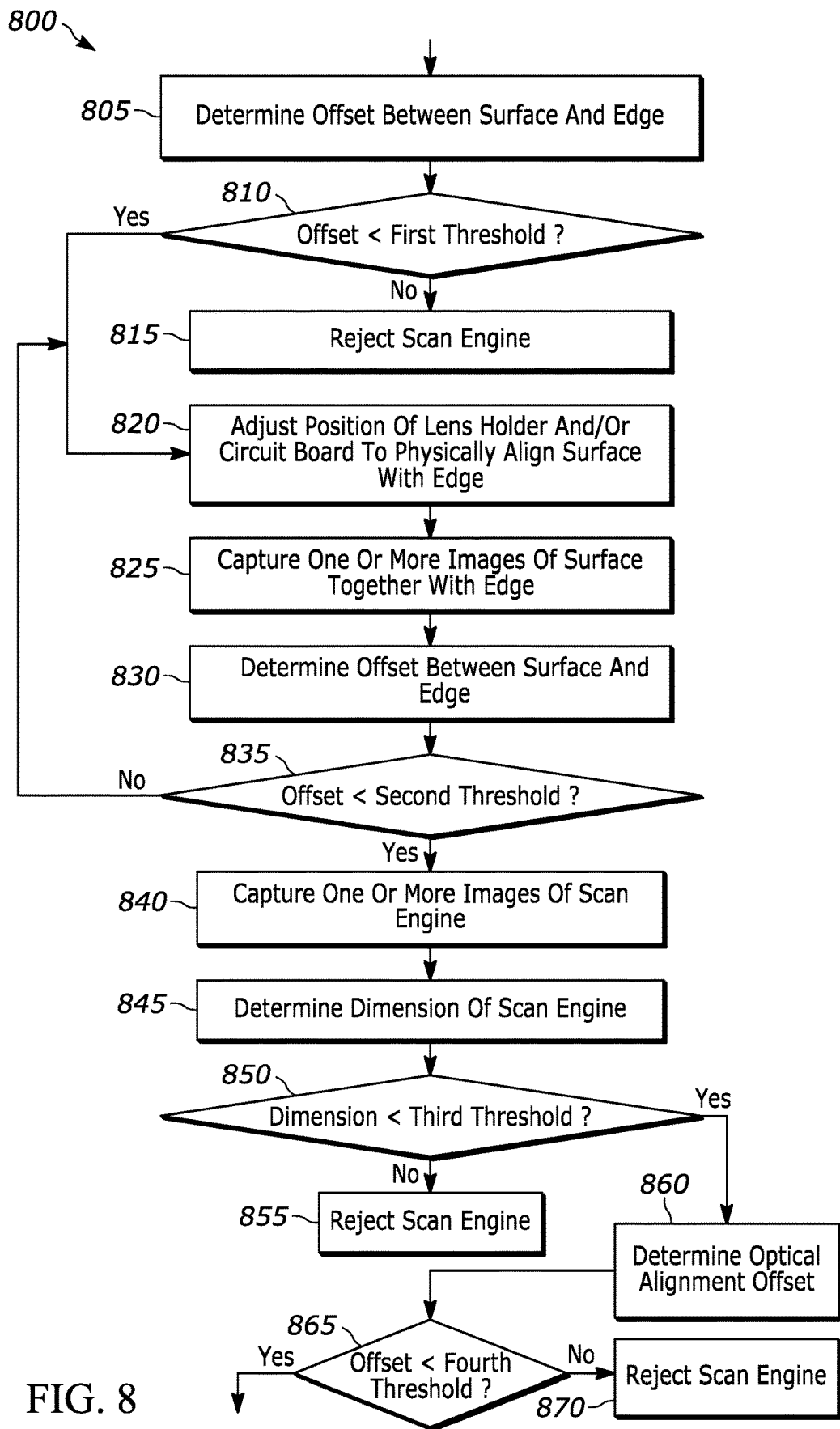
FIG. 8 is a flowchart representative of an example method, hardware logic, machine-readable instructions, or software for adjusting a physical position of a lens holder in a small-height scan engine based upon an edge of a circuit board, in accordance with embodiments of the disclosure.

FIG. 8 is a flowchart 800 representative of example processes, methods, software, machine-readable instructions, etc. for physically aligning a lens holder with a circuit board (e.g., at block 725 of FIG. 7). Any or all of the blocks of FIG. 8 may be an executable program or portion(s) of an executable program embodied in software and/or machine-readable instructions stored on a non-transitory, machine-readable storage medium for execution by one or more processors such as the processor 902 of FIG. 9. Additionally and/or alternatively, any or all of the blocks of FIG. 8 may be implemented by one or more hardware circuits structured to perform the corresponding operation(s) without executing software or instructions.

The flowchart 800 of FIG. 8 begins at block 805 with a controller (e.g., the controller 615 of FIG. 6) determining, based upon captured images (e.g., the images 625), an offset between the surface 145 and the edge 150 after the optical alignment (e.g., at block 715 of FIG. 7) (block 805). To ensure a scan engine being assembled will have sufficient optical alignment, the controller may compare the offset to a first threshold (block 810) and reject (e.g., discard) the scan engine being assembled (block 815) when the offset exceeds the first threshold (block 810). In some examples, the controller only adjusts the position of the lens holder 115 relative to the circuit board 105 and/or the position of the circuit board 105 relative to the lens holder 115 when the lens holder 115 protrudes beyond either edge of the circuit board 105 (e.g., to the right as shown in FIG. 2, or to the left).

At block 820, the controller controls a first fixture (e.g., the fixture 605 of FIG. 6) and/or a second fixture (e.g., the fixture 610 of FIG. 6) to adjust the position of the lens holder 115 relative to the circuit board 105 and/or the position of the circuit board 105 relative to the lens holder 115 based upon images captured of the surface 145 and the edge 150 (block 820). For example, the controller may, as the images are captured, control the first fixture and the second fixture to incrementally move the lens holder 115 and/or the circuit board 105 until the surface 145 and the edge 150 are physically aligned. Additionally and/or alternatively, the controller may determine, based upon the captured images, a needed adjustment, and control the first fixture and/or the second fixture to move the lens holder 115 and/or the circuit board 105 a corresponding amount.

Based upon one or more additional captured images (block 825), the controller determines an offset between the surface 145 and the edge 150 (block 830). The controller compares the offset to a second threshold (e.g., representing an alignment tolerance) (block 835) and, if the offset is greater than the second threshold (block 835), control returns to block 820 for further physical alignment.

If the offset is less than the second threshold (block 835), the camera may capture one or more further captured images (block 840) and the controller may determine an overall dimension (e.g., a width) of the scan engine being assembled (block 845). If the overall dimension exceeds a third threshold (e.g., a maximum size) (block 850), the controller may reject (e.g., discard) the scan engine being assembled (block 855).

Otherwise, the controller, based on one or more images 620 captured by the image sensor 110 through the lens holder 115 determines an amount of optical misalignment or offset (e.g., expressed in pixels) between the image sensor 110 and the lens holder 115 (block 860). If the optical offset is less than a fourth threshold (e.g., representing a predetermined optical alignment tolerance) (block 865), control exits from the example flowchart 800 of FIG. 8. Otherwise (block 865), the controller may reject (e.g., discard) the scan engine being assembled (block 870).

Figure 9:
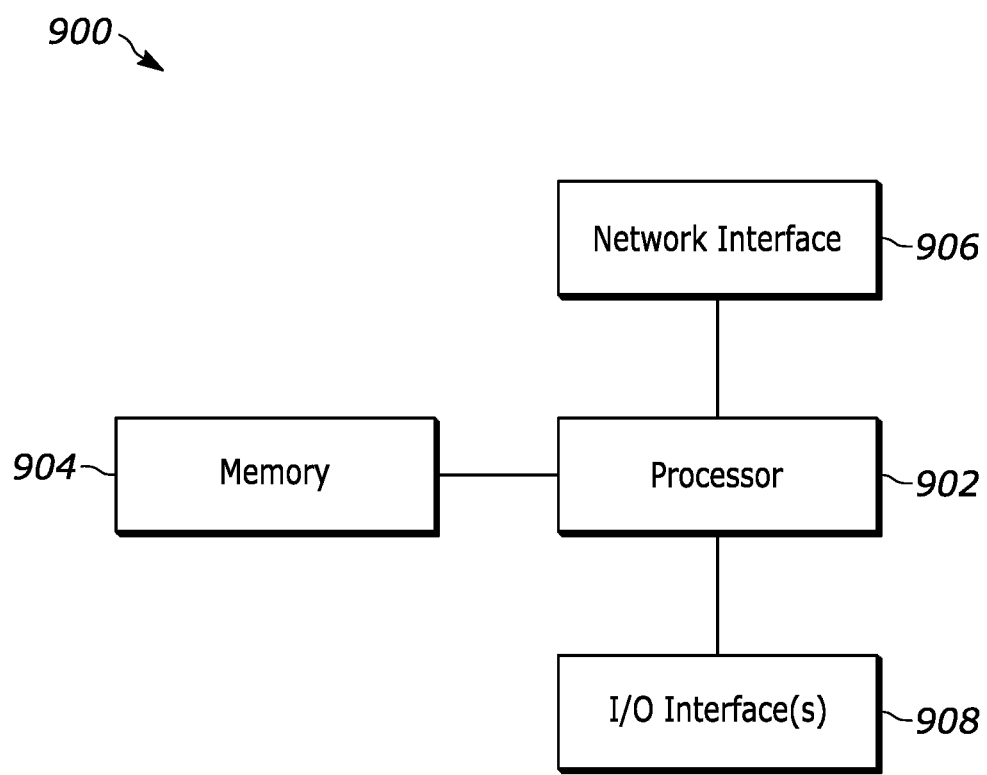
FIG. 9 is a block diagram of an example logic circuit for implementing example methods and/or operations described herein.

FIG. 9 is a block diagram representative of an example logic circuit capable of implementing, for example, one or more components of the example controller 615 of FIG. 6 or, more generally, the example assembly apparatus 600 of FIG. 6. The example logic circuit of FIG. 9 is a processing platform 900 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 900 of FIG. 9 includes a processor 902 such as, for example, one or more microprocessors, controllers, and/or any suitable type of processor. The example processing platform 900 of FIG. 9 includes memory (e.g., volatile memory, non-volatile memory) 904 accessible by the processor 902 (e.g., via a memory controller). The example processor 902 interacts with the memory 904 to obtain, for example, machine-readable instructions stored in the memory 904 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 900 to provide access to the machine-readable instructions stored thereon.

The processing platform 900 of FIG. 9 includes one or more communication interfaces such as, for example, one or more network interface 906, and/or one or more input/output (I/O) interfaces 908. The communication interface(s) enable the processing platform 900 of FIG. 9 to communicate with, for example, another device (e.g., the fixture 605, the fixture 610, the image sensor 110, the circuit board 105, the camera 630, etc.), system, host system, datastore, database, and/or any other machine.

The example processing platform 900 of FIG. 9 also includes the network interface(s) 906 to enable communication with other machines via, for example, one or more networks. The example network interface 906 includes any suitable type of communication interface(s) (e.g., wired and/or wireless interfaces) configured to operate in accordance with any suitable protocol(s).

The example, processing platform 900 of FIG. 9 also includes the input/output (I/O) interface(s) 908 to enable receipt of user input and communication of output data to the user. The input/output (I/O) interface(s) 908 may be used to communicate with, for example, the fixture 605, the fixture 610, the image sensor 110, the circuit board 105, and the camera 630.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present).

Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method comprising:
    optically aligning, using one or more alignment fixtures, one or more lenses or optical elements with an image sensor based upon one or more images captured by the image sensor through the one or more lenses or optical elements; and
        physically aligning, using the one or more alignment fixtures, the one or more lenses or optical elements with the circuit board based upon a misalignment relative to an edge of a circuit board.

2. The method of claim 1, wherein physically aligning the one or more lenses or optical elements with the circuit board includes physically aligning the surface of the one or more lenses or optical elements with the edge of the circuit board.

3. The method of claim 2, wherein the surface of the one or more lenses or optical elements is aligned with the edge of the circuit board when the surface of the one or more lenses or optical elements and the edge of the circuit board are coplanar.

4. The method of claim 2, wherein the surface of the one or more lenses or optical elements, when physically aligned with the edge of the circuit board, together with the edge of the circuit board form a first mounting surface, the method further comprising securing the scan engine in a housing such that the first mounting surface is secured against a second mounting surface of the housing and the circuit board is perpendicular to the second mounting surface.

5. The method of claim 1, wherein the one or more lenses or optical elements is physically aligned with the circuit board to satisfy a dimension requirement.

6. The method of claim 5, wherein the dimension requirement is less than a maximum possible dimension of the circuit board and the one or more lenses or optical elements in combination that includes nominal dimensions, dimension tolerances and alignment tolerances.

7. The method of claim 5, wherein the dimension requirement is 7.2 mm.

8. The method of claim 1, wherein physically aligning the one or more lenses or optical elements with the circuit board includes moving the one or more lenses or optical elements and/or the circuit board along only one axis.

9. The method of claim 1, wherein physically aligning the one or more lenses or optical elements with the circuit board includes:
    capturing, with a camera, one or more first images of the edge of the circuit board together with the surface of the one or more lenses or optical elements;
    moving, using the alignment fixture, the one or more lenses or optical elements and/or the circuit board;
    capturing, with the machine vision camera, one or more second images of the edge of the circuit board together with the surface of the one or more lenses or optical elements; and
    verifying a physical alignment of the surface of the one or more lenses or optical elements with the edge of the circuit board based upon the one or more second images.

10. The method of claim 1, wherein, after physically aligning the one or more lenses or optical elements with the circuit board, the one or more lenses or optical elements is optically misaligned with the image sensor.

11. The method of claim 10, wherein the one or more lenses or optical elements is optically misaligned with the image sensor only along one axis.

12. The method of claim 1, further comprising determining an offset between the edge of the circuit board and the surface of the one or more lenses or optical elements, wherein the one or more lenses or optical elements is physically aligned with the circuit board in response to the offset satisfying a criteria.

13. The method of claim 1, wherein physically aligning the one or more lenses or optical elements with the circuit board includes:
    determining an amount of movement of the one or more lenses or optical elements relative to the circuit board necessary to align the surface of the one or more lenses or optical elements with the edge of the circuit board; and
    determining a rejection when the amount of movement satisfies a criteria.

14. The method of claim 1, further comprising:
    after physically aligning the one or more lenses or optical elements with the circuit board, determining a dimension of the scan engine that includes the circuit board and the one or more lenses or optical elements; and
    determining a rejection when the dimension satisfies a criteria.

15. The method of claim 1, wherein optically aligning the one or more lenses or optical elements with the image sensor includes aligning an optical axis of the one or more lenses or optical elements with a center pixel of the image sensor.

16. The method of claim 1, wherein physically aligning the one or more lenses or optical elements with the circuit board includes moving the one or more lenses or optical elements relative to the circuit board and/or moving the circuit board relative to the one or more lenses or optical elements.

17. The method of claim 1, further comprising, after the circuit board is physically aligned with the one or more lenses or optical elements, securing the one or more lenses or optical elements to the circuit board.

18. An assembly apparatus comprising:
    a first fixture configured to hold a circuit board having an image sensor thereon;
    a second fixture configured to hold one or more lenses or optical elements;
    a camera; and
    a controller configured to
        control at least one of the first fixture or the second fixture to optically align the one or more lenses or optical elements with the image sensor,
        control the camera to capture one or more images of an edge of the circuit board, and
        control the at least one of the first fixture or the second fixture to move relative to the edge of the circuit board.

19. The assembly apparatus of claim 18, wherein the controller is configured to control the at least one of the first fixture or the second fixture to move relative to the edge such that the surface of the one or more lenses or optical elements and the edge of the circuit board are physically aligned.

20. The assembly apparatus of claim 18, wherein the controller is configured to control the at least one of the first fixture or the second fixture to move relative to the edge such that a dimension requirement is satisfied.

21. The assembly apparatus of claim 18, wherein the controller is configured to control the at least one of the first fixture or the second fixture to move relative to the edge such the one or more lenses or optical elements and the circuit board only move relative to each other only along one axis.

22. The assembly apparatus of claim 18, wherein the controller is configured to, after controlling at least one of the first fixture or the second fixture to move based upon the edge, cause the one or more lenses or optical elements to be secured to the circuit board.

\* \* \* \* \*